United States Patent
Cohen

(10) Patent No.: US 10,020,740 B2
(45) Date of Patent: Jul. 10, 2018

(54) SYNCHRONOUS RECTIFIER DRIVE AND SOFT SWITCHING CIRCUIT

(71) Applicant: TEXAS INSTRUMENTS INCORPORATED, Dallas, TX (US)

(72) Inventor: Isaac Cohen, Dix Hills, NY (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 435 days.

(21) Appl. No.: 14/795,101

(22) Filed: Jul. 9, 2015

(65) Prior Publication Data

US 2016/0126845 A1    May 5, 2016

Related U.S. Application Data

(60) Provisional application No. 62/072,226, filed on Oct. 29, 2014.

(51) Int. Cl.
*H02M 3/335* (2006.01)
*H02M 1/00* (2006.01)

(52) U.S. Cl.
CPC ... *H02M 3/33507* (2013.01); *H02M 3/33592* (2013.01); *H02M 2001/0009* (2013.01);
(Continued)

(58) Field of Classification Search
CPC . H02M 2001/0003; H02M 2001/0006; H02M 2001/0009; H02M 2001/0058;
(Continued)

(56) References Cited

U.S. PATENT DOCUMENTS

| 7,706,151 B2* | 4/2010 | Neidorff | H02M 1/4216 363/9 |
| 7,869,231 B2* | 1/2011 | Cohen | H02M 3/33592 363/21.14 |

(Continued)

FOREIGN PATENT DOCUMENTS

| CN | 104081642 A | 10/2014 |
| RU | 2011148380 A | 6/2013 |

(Continued)

OTHER PUBLICATIONS

Search Report for Application No. PCT/US15/58151, dated Mar. 3, 2016.

*Primary Examiner* — Emily P Pham
*Assistant Examiner* — Shahzeb K Ahmad
(74) *Attorney, Agent, or Firm* — Tuenlap D. Chan; Charles A. Brill; Frank D. Cimino

(57) ABSTRACT

A circuit includes a synchronous rectifier that receives an alternating current (AC) voltage from a transformer secondary and provides a rectified direct current (DC) output voltage in response to a control input signal. A secondary rectifier switching circuit generates the control input signal. A current replica circuit generates a control voltage that replicates a current in the transformer secondary. The control voltage is employed to control switching of the secondary rectifier switching circuit based on the current in the transformer secondary. An offset circuit forces the control voltage in a predetermined direction to mitigate voltage error accumulations in the current replica circuit. A clamp circuit limits the control voltage to a predetermined voltage value.

18 Claims, 6 Drawing Sheets

(52) U.S. Cl.
CPC .. *H02M 2001/0058* (2013.01); *Y02B 70/1475* (2013.01); *Y02B 70/1491* (2013.01)

(58) Field of Classification Search
CPC ............... H02M 3/1588; H02M 3/335; H02M 3/33507; H02M 3/33538; H02M 3/33576; H02M 3/33592
See application file for complete search history.

(56) References Cited

U.S. PATENT DOCUMENTS

| | | | |
|---|---|---|---|
| 2004/0125621 A1 | 7/2004 | Yang et al. | |
| 2013/0027987 A1* | 1/2013 | Yang | H02M 3/33592 363/21.14 |
| 2013/0154595 A1* | 6/2013 | Drinovsky | G05F 1/561 323/282 |
| 2013/0194836 A1 | 8/2013 | Morris et al. | |
| 2014/0078788 A1* | 3/2014 | Yao | H02M 3/33592 363/21.14 |
| 2014/0119063 A1* | 5/2014 | Tseng | H02M 1/36 363/21.05 |

FOREIGN PATENT DOCUMENTS

| | | |
|---|---|---|
| SU | 1229916 A1 | 5/1986 |
| TW | 200937825 A | 9/2009 |

\* cited by examiner

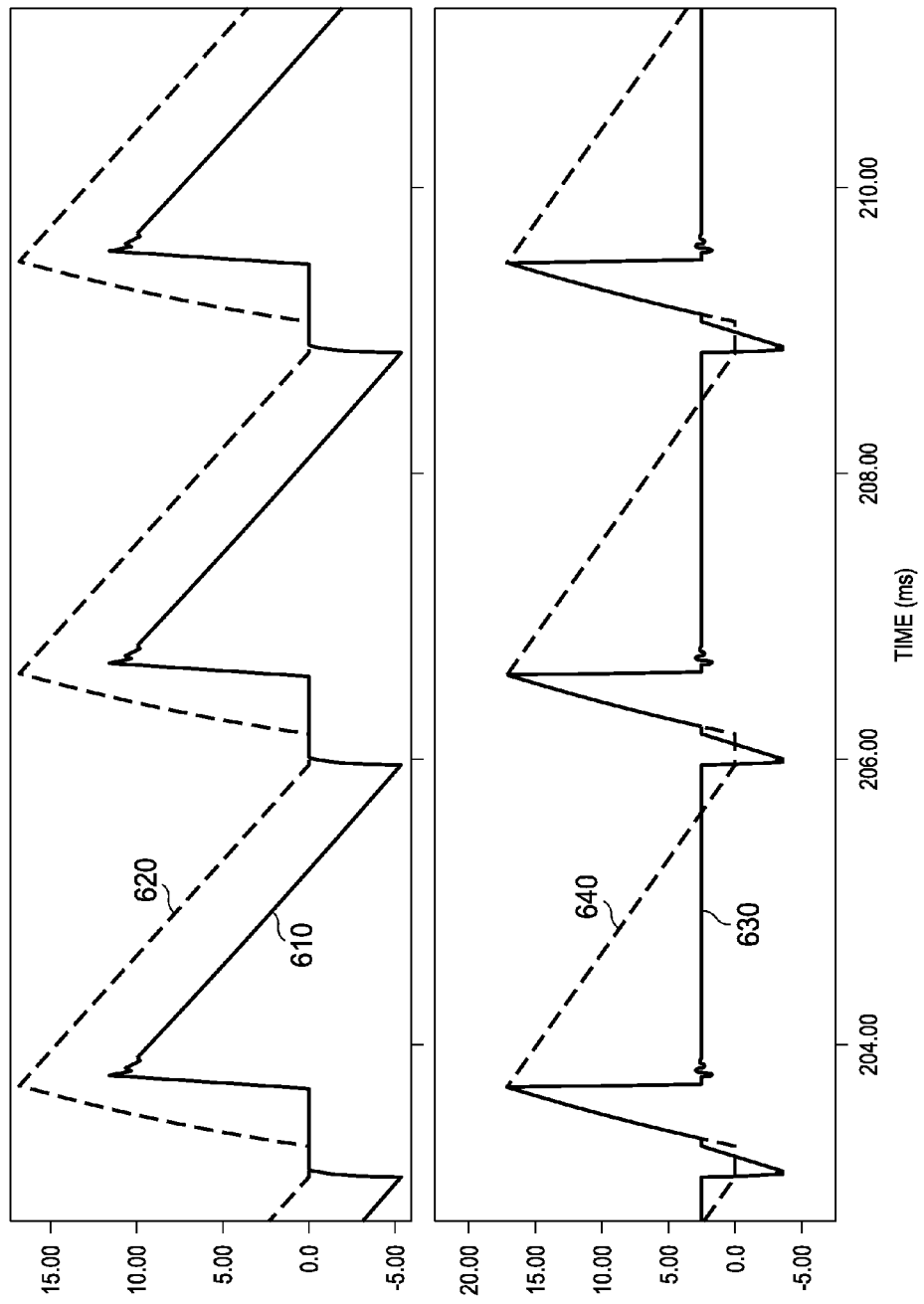

# SYNCHRONOUS RECTIFIER DRIVE AND SOFT SWITCHING CIRCUIT

CROSS-REFERENCE TO RELATED APPLICATION

This application claims the benefit of U.S. Provisional Patent Application 62/072,226 filed on Oct. 29, 2014, and entitled SYNCHRONOUS RECTIFIER DRIVE AND SOFT SWITCHING CIRCUIT, the entirety of which is incorporated by reference herein.

TECHNICAL FIELD

This disclosure relates to power supply circuits circuit and more particularly to a synchronous rectifier drive and soft switching circuit.

BACKGROUND

Synchronous rectification is a technique for improving the efficiency of rectification in power supplies by replacing diodes with actively controlled switches such as transistors (e.g., power MOSFETs). The constant voltage drop of a standard p-n junction diode often used for power supply rectification is typically between 0.7 V and 1.7 V causing significant power loss in the diode. One solution to this problem replaces standard silicon diodes with Schottky diodes, which exhibit very low voltage drops (e.g., as low as 0.3 volts). However, even Schottky rectifiers can be significantly more lossy than the synchronous type at high current values and low voltages.

When addressing very low-voltage converters, such as a buck converter power supply for a computer (with a voltage output of five volts or less, and many amperes of output current), Schottky rectification does not provide adequate efficiency. In such applications, synchronous rectification becomes necessary. Replacing the diode with an actively controlled switching element such as a MOSFET is the main factor of synchronous rectification. The MOSFETs have a constant very low resistance when conducting, referred to as on-resistance (RDS(on)). They can be made with an on-resistance as low as ten mΩ or even lower. The voltage drop across the transistor is then much lower versus a diode rectifier, meaning a reduction in power loss and a gain in efficiency.

The control circuitry for synchronous rectification often uses comparators to sense the voltage of the input AC and activates the transistors at the correct times to allow current to flow in the desired direction to produce DC voltages. The timing is important, as a short circuit across the input power must be avoided and can easily be caused by one transistor turning on before another has turned off. One issue with such type of control circuits is that in order to turn the rectifiers off at the correct time, current may have to be directly sensed at the output of the power supply circuit which can be a problem for some applications.

SUMMARY

This disclosure relates to a synchronous rectifier drive and soft switching circuit. In one example, a circuit includes a synchronous rectifier that receives an alternating current (AC) voltage from a transformer secondary and provides a rectified direct current (DC) output voltage in response to a control input signal applied to the synchronous rectifier. A secondary rectifier switching circuit generates the control input signal applied to the synchronous rectifier. A current replica circuit generates a control voltage that replicates a current in the transformer secondary. The control voltage is employed to control switching of the secondary rectifier switching circuit based on the current in the transformer secondary. An offset circuit forces the control voltage in a predetermined direction to mitigate voltage error accumulations in the current replica circuit. A clamp circuit limits the control voltage to a predetermined voltage value.

In another example, a circuit includes a synchronous rectifier that receives an alternating current (AC) voltage from a transformer secondary and provides a rectified direct current (DC) output voltage in response to a control input signal applied to the synchronous rectifier. A secondary rectifier switching circuit generates the control input signal applied to the synchronous rectifier. A current replica circuit generates a control voltage that replicates a current in the transformer secondary. The control voltage is employed to control switching of the secondary rectifier switching circuit based on the current in the transformer secondary. The current replica circuit includes a voltage-to-current converter to generate a replica current in proportion to the AC voltage of the transformer secondary. The current replica circuit includes an integrating capacitor to generate the control voltage by integrating the replica current from the voltage-to-current converter. An offset circuit employs a current source to force the control voltage in a predetermined direction to mitigate voltage error accumulations on the integrating capacitor in the current replica circuit. A clamp circuit employs a diode to clamp the control voltage to a predetermined voltage value set by a voltage source.

In yet another example, a circuit includes a synchronous rectifier that receives an alternating current (AC) voltage from a transformer secondary and provides a rectified direct current (DC) output voltage in response to a control input signal applied to the synchronous rectifier. A secondary rectifier switching circuit generates the control input signal applied to the synchronous rectifier. A current transformer generates a sense current proportional to a current in the transformer secondary. A current replica circuit generates a control voltage that replicates the sense current from the transformer secondary. The control voltage is employed to control switching of the secondary rectifier switching circuit based on the sense current from the transformer secondary. A current offset circuit forces the control voltage in a predetermined direction to mitigate voltage error accumulations in the current replica circuit. A voltage offset circuit to limit an amplitude of current flowing in the transformer secondary to a predetermined negative value.

BRIEF DESCRIPTION OF THE DRAWINGS

FIG. 6 illustrates an example of steady state operating waveforms for the example isolated circuit implementation for the synchronous rectifier power supply circuit depicted in FIG. 5.

DETAILED DESCRIPTION

This disclosure relates to a synchronous rectifier drive and soft switching circuit. A high current and low voltage control and drive circuit is provided for control of synchronous rectifiers that enables substantially zero volt switching operation without direct sensing of rectifier current. This includes providing a quality synchronous rectifier drive signal along with accurate control of reverse current in the rectifier without direct sensing of rectifier current. Indirect current sensing is provided via a current replica circuit that reproduces a facsimile of rectifier current utilizing a voltage-to-current converter that is driven from the secondary of a transformer. The current replica circuit generates a control voltage that replicates a current in the transformer secondary, where the control voltage is employed to control switching of a secondary rectifier switching The current replica circuit includes an integrating capacitor to generate the control voltage by integrating the replica current from the voltage-to-current converter.

Overtime, it is possible that error voltages can accumulate on the integrating capacitor of the current replica circuit. Thus, an offset circuit employs a current source to force the control voltage in a predetermined direction to mitigate voltage error accumulations on the integrating capacitor in the current replica circuit. A clamp circuit employs a diode to clamp the control voltage to a predetermined voltage value set by a voltage source to control the amount of offset injected by the offset circuit. The drive circuit enables substantially zero volt switching in all switches of the converter for near transition mode operation over a wide range of input voltage and output load conditions. Circuit architecture provides inherent overload and short circuit protection along with communication between the primary and secondary of isolated converters that facilitates standby power management.

Figure 1:
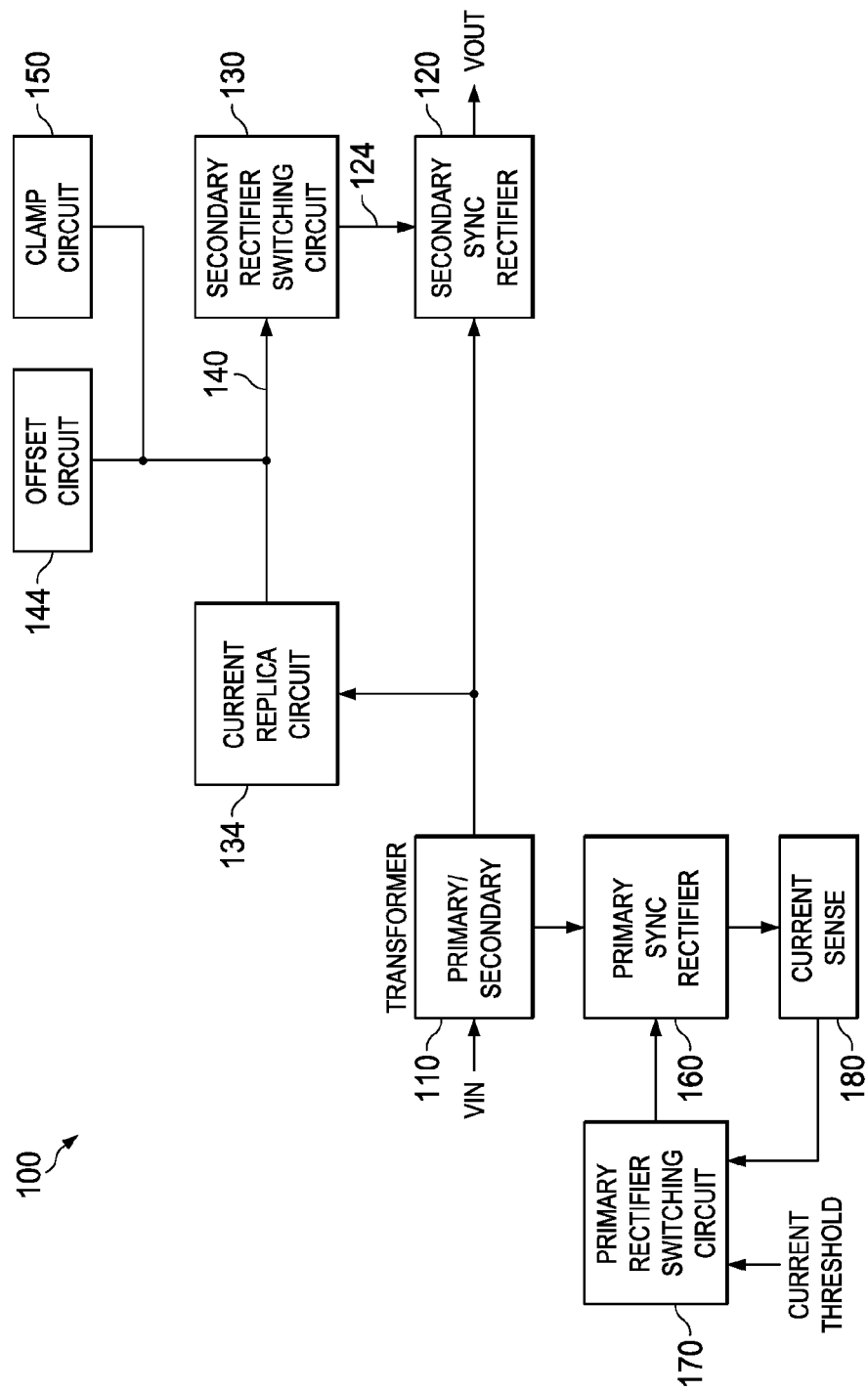
FIG. 1 illustrates an example block diagram of a synchronous rectifier power supply circuit that utilizes indirect sensing of rectifier current to control switching operations of the circuit.

FIG. 1 illustrates an example block diagram of a synchronous rectifier power supply circuit 100 that utilizes indirect sensing of rectifier current to control switching operations of the circuit. As used herein, the term circuit can include a collection of active and/or passive elements that perform a circuit function such as an analog circuit or control circuit, for example. The term circuit can also include an integrated circuit where all the circuit elements are fabricated on a common substrate, for example. The circuit 100 includes a transformer 110 having a primary and secondary winding, where an input voltage VIN is coupled to the primary winding. A secondary synchronous rectifier 120 receives an alternating current (AC) voltage from the transformer 110 secondary and provides a rectified direct current (DC) output voltage VOUT in response to a control input signal 124 applied to the synchronous rectifier. The circuit 100 can support buck converter operations where the VOUT is less than VIN, boost converter operations where VOUT is greater than VIN, and fly back converter operation that supports both buck and boost operations.

A secondary rectifier switching circuit 130 generates the control input signal 124 applied to the secondary synchronous rectifier 120. A current replica circuit 134 generates a control voltage 140 that replicates a current in the transformer secondary. The control voltage 140 is employed to control switching of the secondary rectifier switching circuit 130 based on the current in the transformer secondary. An offset circuit 144 forces the control voltage 140 in a predetermined direction to mitigate voltage error accumulations in the current replica circuit 134. A clamp circuit 150 limits the control voltage to a predetermined voltage value.

As will be illustrated below with respect to FIG. 2, the current replica circuit 134 includes a voltage-to-current converter and an integrating capacitor. The voltage-to-current converter in the replica circuit 134 generates a replica current in proportion to the AC voltage of the transformer secondary. The integrating capacitor in the replica circuit generates the control voltage 134 by integrating the replica current from the voltage-to-current converter. By utilizing the voltage-to-current converter and integrating capacitor in this manner, indirect sensing of the transformer 110 secondary current is provided. However, voltage can accumulate on the integrating capacitor overtime and thus the offset circuit is provided to mitigate such accumulations on the integrating capacitor of the current replica circuit 134.

In one example, the offset circuit 144 forces the control voltage 140 in a predetermined positive direction with respect to ground. The offset circuit 144 can include a current source that injects a current into the integrating capacitor of the current replica circuit 134 to force the control voltage 140 in a predetermined positive direction with respect to ground. The clamp circuit 150 can utilize a diode to clamp the control voltage 140 to a predetermined voltage value set by a voltage source as will be illustrated and described below with respect to FIG. 2.

The secondary rectifier switching circuit 130 can include a secondary zero volt switching comparator to turn on the secondary synchronous rectifier 120 with respect to a voltage reference source that is added to the rectified DC output voltage VOUT. Also, the secondary rectifier switching circuit 130 can include a turn off comparator to turn off the synchronous rectifier 120 when the control voltage of the integrating capacitor reaches substantially zero voltage with respect to ground. The turn off comparator can be utilized for output short circuit protection where the turn off comparator turns off the synchronous rectifier 120 if the rectified DC output voltage is shorted with respect to ground.

As shown, the circuit 100 also includes a primary synchronous rectifier 160 that switches the primary winding of the transformer 110. A primary rectifier switching circuit 170 controls the primary synchronous rectifier 160. The primary rectifier switching circuit 170 includes a peak current detector comparator that turns off the primary synchronous rectifier 160 when current in the primary winding sensed by a current sense 180 (e.g., sense resistor) reaches a predetermined current threshold. The primary rectifier switching circuit 170 can include a primary zero volt switching detector comparator that turns on the primary synchronous rectifier 160 when voltage on the primary winding of the transformer 110 reaches a predetermined voltage threshold.

Figure 2:
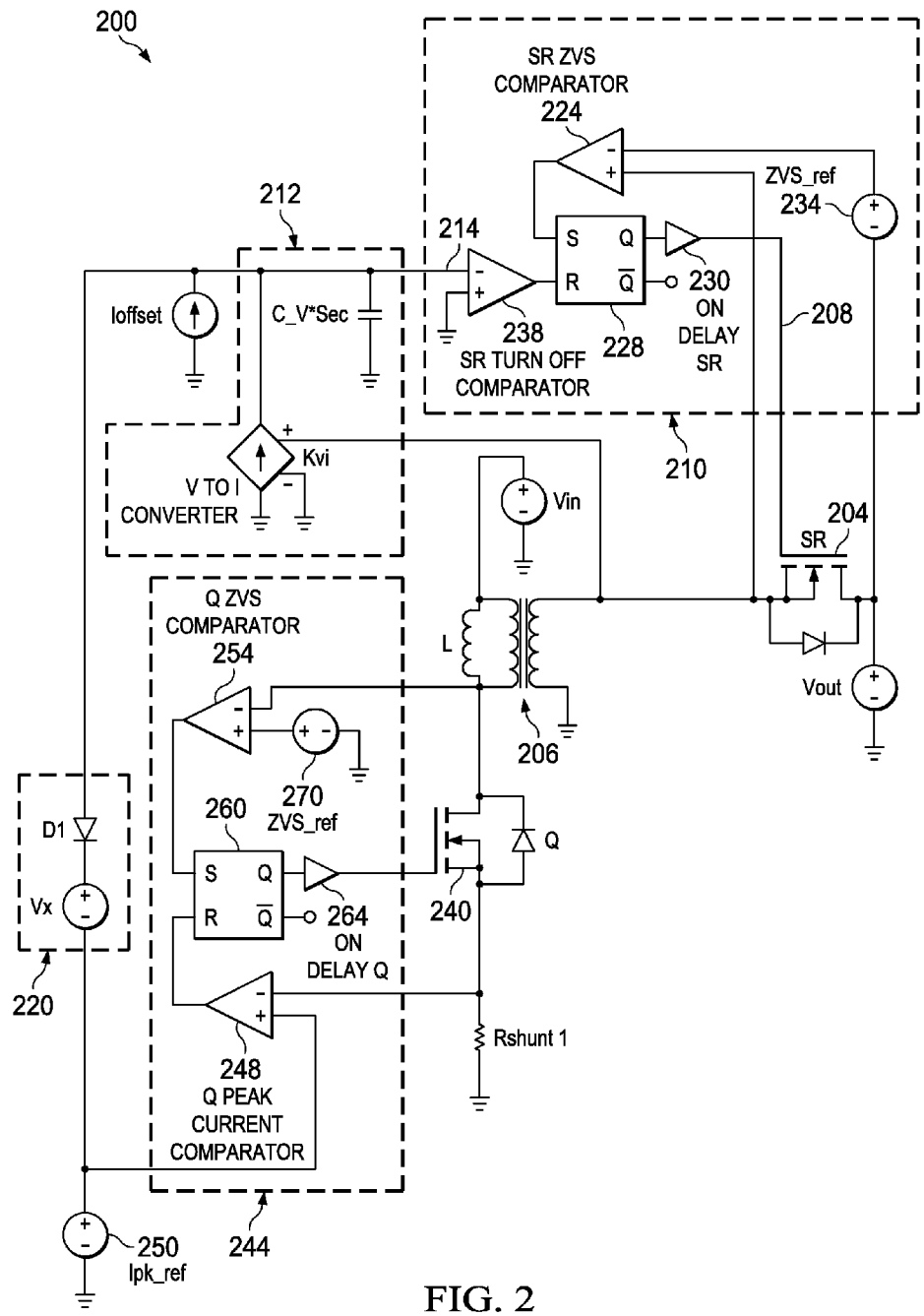
FIG. 2 illustrates an example circuit implementation of a synchronous rectifier power supply circuit that utilizes indirect sensing of rectifier current to control switching operations of the circuit.

FIG. 2 illustrates an example circuit implementation of a synchronous rectifier power supply circuit 200 that utilizes indirect sensing of rectifier current to control switching operations of the circuit. The circuit 200 includes a synchronous rectifier 204 that receives an alternating current (AC) voltage from a transformer secondary of transformer 206 and provides a rectified direct current (DC) output voltage VOUT in response to a control input signal 208 applied to the synchronous rectifier. A secondary rectifier switching circuit 210 generates the control input signal 208 applied to the synchronous rectifier 204. A current replica circuit 212 generates a control voltage 214 that replicates a current in the transformer secondary of the transformer 206. The control voltage 214 is employed to control switching of the secondary rectifier switching circuit 210 based on the current in the transformer secondary.

The current replica circuit 212 includes a voltage-to-current converter shown as Kvi to generate a replica current in proportion to the AC voltage of the transformer secondary. An integrating capacitor C_V*SEC generates the control voltage 214 by integrating the replica current from the voltage-to-current converter Kvi. An offset circuit IOFFSET employs a current source to force the control voltage in a predetermined direction to mitigate voltage error accumulations on the integrating capacitor C_V*SEC in the current replica circuit 212. In some cases, circuit components in the circuit 200 can be adjusted to provide the offset current from IOFFSET. In other examples, a dedicated current source can be provided for IOFFSET. A clamp circuit 220 employs a diode D1 to clamp the control voltage 214 to a predetermined voltage value set by a voltage source Vx. In one example, the offset circuit IOFFSET forces the control voltage 214 in a predetermined positive direction with respect to ground.

The secondary rectifier switching circuit 210 includes a secondary zero volt switching comparator 224 to turn on the synchronous rectifier 204 via flip flop 228 and delay 230 with respect to a voltage reference source 234 that is added to the rectified DC output voltage VOUT. The secondary rectifier switching circuit 210 also includes a turn off comparator 238 to turn off the synchronous rectifier 204 when the control voltage 214 of the integrating capacitor C_V*SEC reaches substantially zero voltage with respect to ground.

As shown, a primary synchronous rectifier 240 switches a primary winding operatively coupled to the transformer secondary. The primary winding of transformer 206 can also include a magnetizing inductance L and is driven by input voltage VIN. A primary rectifier switching circuit 244 controls the primary synchronous rectifier 240. The primary rectifier switching circuit 244 includes a peak current detector comparator 248 that turns off the primary synchronous rectifier 240 when current in the primary winding reaches a predetermined current threshold set by voltage source 250. The primary rectifier switching circuit 244 includes a primary zero volt switching detector comparator 254 that turns on the primary synchronous rectifier 240 via flip flop 260 and delay 264 when voltage on the primary winding reaches a predetermined voltage threshold set by reference 270.

The voltage of the secondary winding of the transformer 206 is applied to the voltage-to-current converter having a conversion constant Kvi. The output current of the voltage-to-current converter charges the C_V*SEC capacitor. As a result, a voltage is created across the capacitor C_V*SEC that is an analog of the current in the magnetizing inductance L. The capacitance C_V*SEC and Kvi can be selected so the numerical value of the said voltage is equal to the numerical value of the said current however other selections are possible (e.g., voltage twice the current). Due to leakages and offsets, the DC current information on C_V*SEC can gradually deteriorate and the voltage waveform on the capacitor can drift up or down. As such, the current offset Ioffset of suitable value is injected into the C_V*SEC capacitor such that the voltage waveform is forced to drift in the positive direction, where the current represented by C_V*SEC can be proportional to the output voltage of the converter.

The drift on C_V*SEC can be limited by clamping the voltage via diode D1 to a the sum of a voltage Vx and a reference voltage Ipk_ref at 250. Both the primary synchronous rectifier 240 and the secondary synchronous rectifier 204 turn on when the voltage across each (respectively) drops to about zero. The primary synchronous rectifier 240 turns off when the current in reaches a peak value equal to the reference Ipk_ref set at 250. The secondary synchronous rectifie 204 turns off when the voltage across C_V*SEC discharges to about zero. As a result, the circuit 200 can self oscillate, changing states when the current as detected by Rshunt in the primary rectifier 240 equals Ipk_ref set via source 250 or the current in the secondary synchronous rectifier 204 reaches a negative value −Vx.

Figure 3:
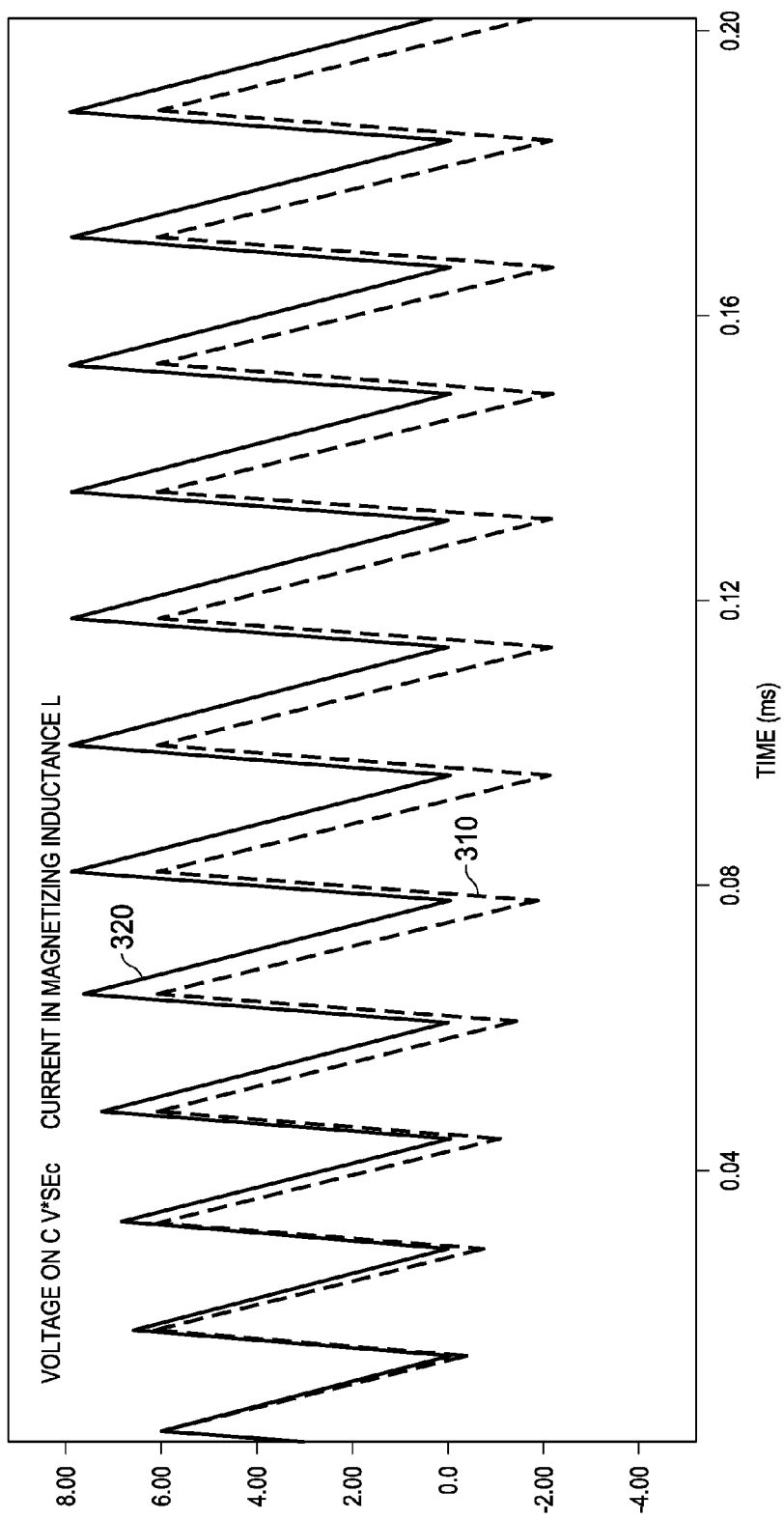
FIG. 3 illustrates an example of startup waveforms for the example circuit implementation for the synchronous rectifier power supply circuit depicted in FIG. 2.
Figure 4:
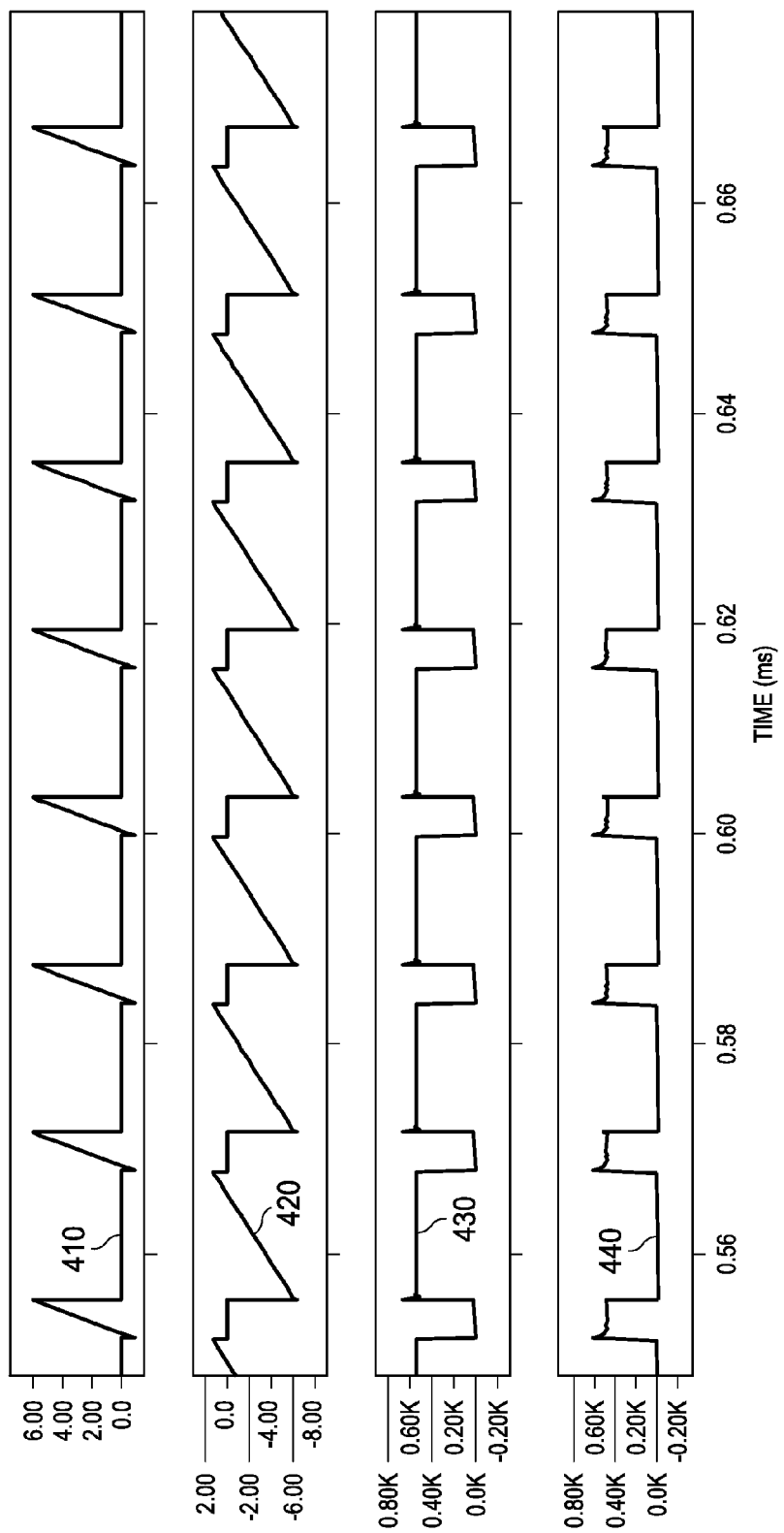
FIG. 4 illustrates an example of steady state operating waveforms for the example circuit implementation for the synchronous rectifier power supply circuit depicted in FIG. 2.

FIGS. 3 and 4 are now described with reference to the example circuit 200 of FIG. 2. FIG. 3 illustrates an example of startup waveforms for the example circuit implementation for the synchronous rectifier power supply circuit depicted in FIG. 2. The horizontal axis of FIG. 3 represents time in milliseconds the vertical axis is volts. A waveform 310 represents the startup voltage waveform in the magnetizing inductance L of FIG. 2. A waveform 320 illustrates the voltage waveform developed across integrating capacitor C_V*SEC of FIG. 2. As shown, a small positive offset is introduced where the magnitude of the voltage on C_V*SEC is slightly larger than the magnitude of the voltage across the magnetizing inductance L. The voltage maximum of the waveform is clamped to a maximum value via the clamp circuit described herein. FIG. 4 illustrates an example of steady state operating waveforms for the example circuit implementation for the synchronous rectifier power supply circuit depicted in FIG. 2. A waveform 510 represents current flowing through primary rectifier 240. A waveform 520 represents current flowing through the secondary rectifier 204. The voltage waveforms 530 and 540 represent the respective voltage waveforms for the primary and secondary rectifiers 240 and 204, respectively.

Figure 5:
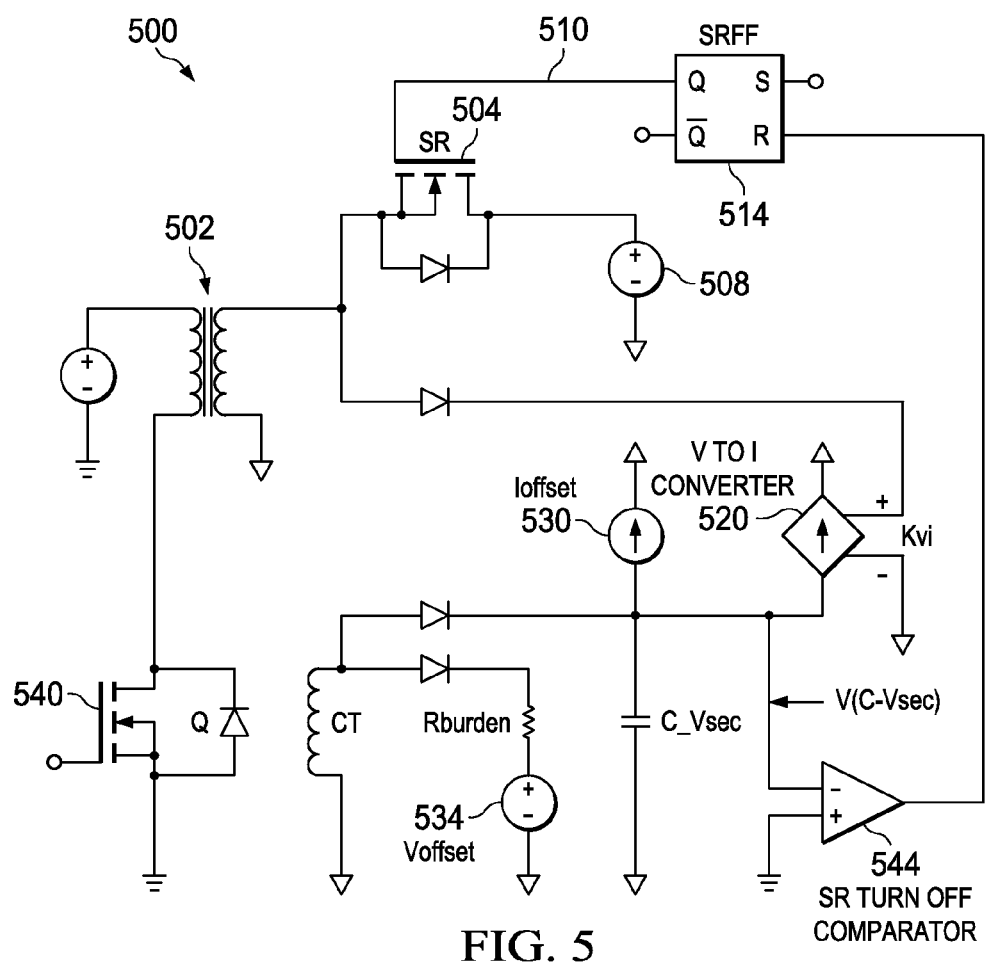
FIG. 5 illustrates an example of an isolated synchronous rectifier power supply circuit that utilizes indirect sensing of rectifier current to control switching operations of the circuit.

FIG. 5 illustrates an example of an isolated synchronous rectifier power supply circuit 500 that utilizes indirect sensing of rectifier current to control switching operations of the circuit. For purposes of brevity each component of the circuit 500 is not described in view of the previous example circuits described herein. Similar to above, the circuit 500 includes a synchronous rectifier 504 that receives an alternating current (AC) voltage from a transformer 502 having a secondary and provides a rectified direct current (DC) output voltage at 508 in response to a control input signal 510 applied to the synchronous rectifier. A secondary rectifier switching circuit including flip flop 514 generates the control input signal 510 applied to the synchronous rectifier 504. A current transformer CT generates a sense current proportional to a current in the transformer primary. A current replica circuit includes voltage-to-current converter 520 and C_V*SEC capacitor. After the primary switch 504 turns off, the current replica circuit generates a control voltage 524 that replicates the current in the synchronous rectifier/transformer secondary. The control voltage 524 is employed to control switching of the secondary rectifier switching circuit based on the replicated current in the synchronous rectifier/transformer secondary. A current offset circuit 530 forces the control voltage 524 in a predetermined direction to mitigate voltage error accumulations in the current replica circuit. A voltage offset circuit 534 elevates the current replica by a determined amount such that when the control voltage 524 reaches zero and the synchronous rectifier 504 turns off, the current in the synchronous rectifier/transformer secondary is at the negative value such as to cause the drain of the primary switch 540 to be substantially close to zero.

During the on time of primary switch 540, the current transformer CT delivers a current into R burden that is proportional to the current in the magnetizing inductance of the transformer. The C_V*SEC capacitor charges to a voltage proportional to the magnetizing inductance current of the transformer plus an offset voltage Voffset at 534. The component values can be selected so the numerical value of the voltage drop on Rburden is equal to the numerical value of the magnetizing inductance current however, other selection criteria are possible. When the primary switch 540 turns off, the synchronous rectifier 504 is turned ON and C_V*SEC is discharged by a current proportional to the voltage applied across the magnetizing inductance current of the transformer 502. Thus, the slope of voltage on C_V*SEC is about equal to the slope of the decay of the current in the magnetizing inductance.

When the magnetizing current reaches zero value, C_V*SEC is still charged to a value of Voffset set at 534. As C_V*SEC continues to discharge, the current in the magnetizing inductance reverses. When the voltage on C_V*SEC reaches zero, a synchronous rectifier turn off comparator 544 turns off the rectifier 504 and the negative magnetizing inductance current is transferred to the primary of transformer 502 to enable zero volt switching (ZVS) turn on of the transistor 540. The amplitude of the negative current is set by the value of Voffset at 534. To avoid runaway of the voltage on C_V*SEC, a small negative offset current Ioffset at 530 is added that is at least equal to the positive offset currents that may be present in the circuit. The Ioffset is shown for illustrative purposes only. In some implementations its effect can be realized by appropriately adjustment (mismatching) the charging and discharging V-to-I conversion gains of the converter 520.

FIG. 6 illustrates an example of steady state operating waveforms for the example isolated circuit implementation for the synchronous rectifier power supply circuit depicted in FIG. 5. A waveform at 610 represents current in the synchronous rectifier 504. A waveform 620 represents the voltage generated across integrating capacitor C_V*SEC of FIG. 5. A waveform at 630 represents the voltage across the transformer CT with respect to waveform 640 representing the voltage generated across integrating capacitor C_V*SEC of FIG. 5.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
   a synchronous rectifier that receives an alternating current (AC) voltage from a transformer secondary and provides a rectified direct current (DC) output voltage in response to a control input signal applied to the synchronous rectifier;
   a secondary rectifier switching circuit to generate the control input signal applied to the synchronous rectifier;
   a current replica circuit to generate a control voltage that replicates a current in the transformer secondary, wherein the control voltage is employed to control switching of the secondary rectifier switching circuit based on the current in the transformer secondary;
   an offset circuit to force the control voltage in a predetermined direction to mitigate voltage error accumulations in the current replica circuit; and
   a clamp circuit to limit the control voltage to a predetermined voltage value.

2. The circuit of claim 1, wherein the current replica circuit further comprises a voltage-to-current converter and an integrating capacitor, the voltage-to-current converter generates a replica current in proportion to the AC voltage of the transformer secondary and the integrating capacitor generates the control voltage by integrating the replica current from the voltage-to-current converter.

3. The circuit of claim 2, wherein the offset circuit forces the control voltage in a predetermined positive direction with respect to ground.

4. The circuit of claim 3, wherein the offset circuit includes a current source that injects a current into the integrating capacitor of the current replica circuit to force the control voltage in a predetermined positive direction with respect to ground.

5. The circuit of claim 4, wherein the clamp circuit employs a diode to clamp the control voltage to a predetermined voltage value set by a voltage source.

6. The circuit of claim 1, wherein the secondary rectifier switching circuit includes a secondary zero volt switching comparator to turn on the synchronous rectifier with respect to a voltage reference source that is added to the rectified DC output voltage.

7. The circuit of claim 6, wherein the secondary rectifier switching circuit includes a turn off comparator to turn off the synchronous rectifier when the control voltage of the integrating capacitor reaches substantially zero voltage with respect to ground.

8. The circuit of claim 7, wherein the turn off comparator turns off the synchronous rectifier if the rectified DC output voltage is shorted with respect to ground.

9. The circuit of claim 1, further comprising a primary synchronous rectifier that switches a primary winding operatively coupled to the transformer secondary.

10. The circuit of claim 9, further comprising a primary rectifier switching circuit to control the primary synchronous rectifier, wherein the primary rectifier switching circuit includes a peak current detector comparator that turns off the primary synchronous rectifier when current in the primary winding reaches a predetermined current threshold.

11. The circuit of claim 10, wherein the primary rectifier switching circuit includes a primary zero volt switching detector comparator that turns on the primary synchronous rectifier when voltage on the primary winding reaches a predetermined voltage threshold.

12. A circuit comprising:
    a synchronous rectifier that receives an alternating current (AC) voltage from a transformer secondary and provides a rectified direct current (DC) output voltage in response to a control input signal applied to the synchronous rectifier;

a secondary rectifier switching circuit to generate the control input signal applied to the synchronous rectifier;

a current replica circuit to generate a control voltage that replicates a current in the transformer secondary, wherein the control voltage is employed to control switching of the secondary rectifier switching circuit based on the current in the transformer secondary, the current replica circuit includes:

a voltage-to-current converter to generate a replica current in proportion to the AC voltage of the transformer secondary; and an integrating capacitor to generate the control voltage by integrating the replica current from the voltage-to-current converter;

an offset circuit that employs a current source to force the control voltage in a predetermined direction to mitigate voltage error accumulations on the integrating capacitor in the current replica circuit; and a clamp circuit that employs a diode to clamp the control voltage to a predetermined voltage value set by a voltage source.

13. The circuit of claim 12, wherein the offset circuit forces the control voltage in a predetermined positive direction with respect to ground.

14. The circuit of claim 12, wherein the secondary rectifier switching circuit includes a secondary zero volt switching comparator to turn on the synchronous rectifier with respect to a voltage reference source that is added to the rectified DC output voltage.

15. The circuit of claim 14, wherein the secondary rectifier switching circuit includes a turn off comparator to turn off the synchronous rectifier when the control voltage of the integrating capacitor reaches substantially zero voltage with respect to ground.

16. The circuit of claim 15, wherein the turn off comparator turns off the synchronous rectifier if the rectified DC output voltage is shorted with respect to ground.

17. The circuit of claim 12, further comprising a primary synchronous rectifier that switches a primary winding operatively coupled to the transformer secondary.

18. The circuit of claim 17, further comprising a primary rectifier switching circuit to control the primary synchronous rectifier, wherein the primary rectifier switching circuit includes a peak current detector comparator that turns off the primary synchronous rectifier when current in the primary winding reaches a predetermined current threshold.

\* \* \* \* \*